(No Model.)
C. P. STEINMETZ.
SYSTEM OF ELECTRICAL DISTRIBUTION.
No. 561,735. Patented June 9, 1896.
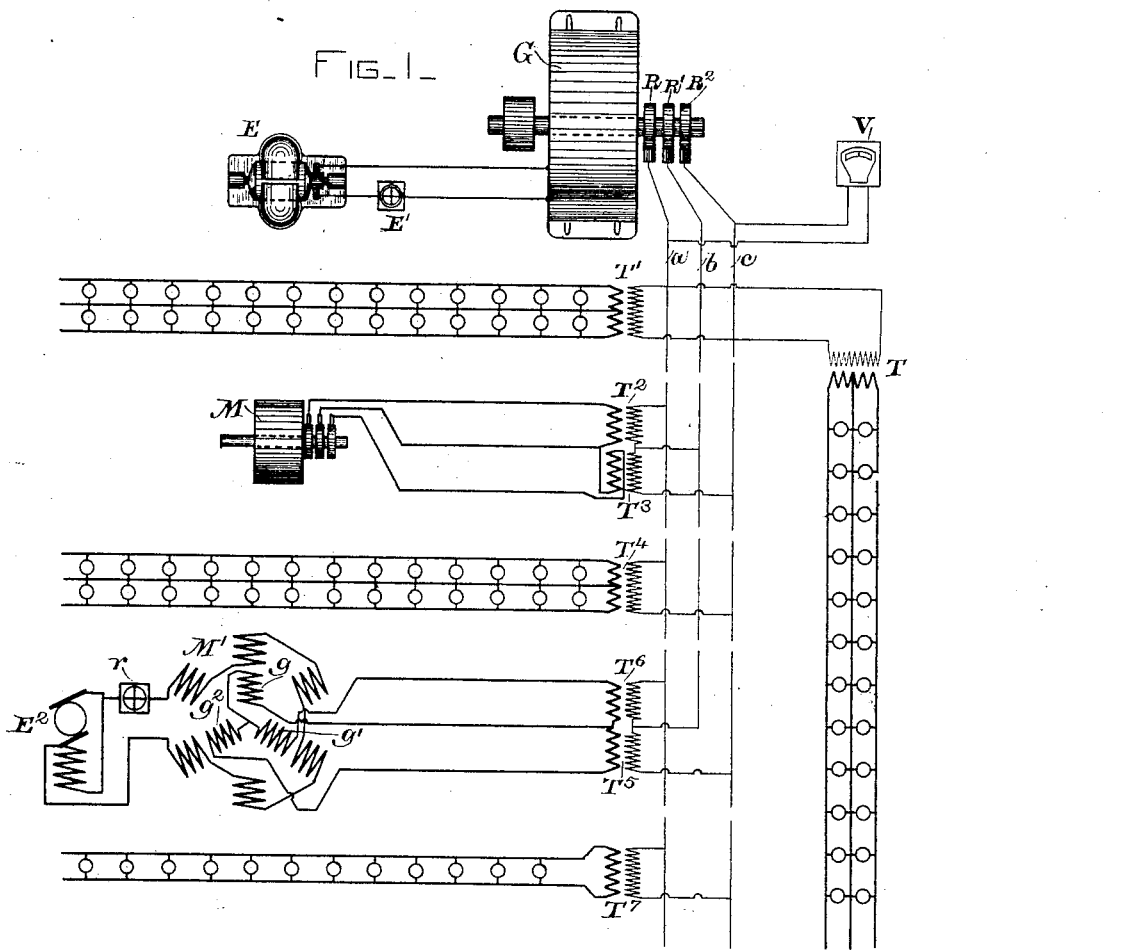
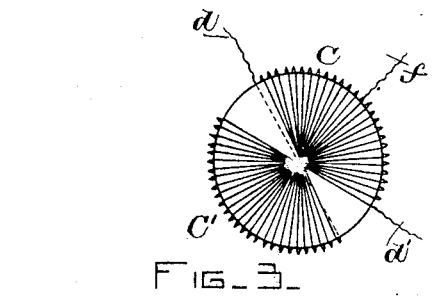
Fig. 3.
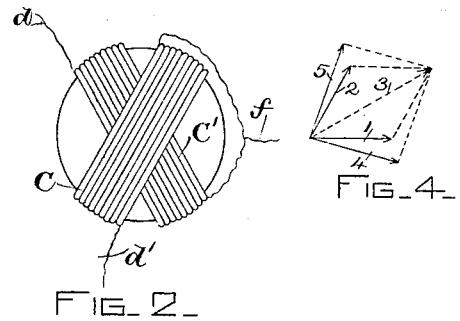
Fig. 2.
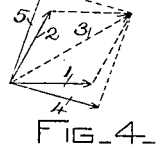
Fig. 4.
WITNESSES
Henry Westendarp.
A. A. McBride
INVENTOR
Charles P. Steinmetz
by Beuldig + Blodgett
Attys

UNITED STATES PATENT OFFICE.

CHARLES P. STEINMETZ, OF LYNN, MASSACHUSETTS, ASSIGNOR TO THE GENERAL ELECTRIC COMPANY, OF NEW YORK.

SYSTEM OF ELECTRICAL DISTRIBUTION.

SPECIFICATION forming part of Letters Patent No. 561,735, dated June 9, 1896.

Application filed January 6, 1894. Serial No. 495,931. (No model.)

*To all whom it may concern:*

Be it known that I, CHARLES P. STEINMETZ, a subject of the Emperor of Germany, residing at Lynn, county of Essex, and State of Massachusetts, have invented a certain new and useful Improvement in Systems of Electrical Distribution, of which the following is a specification.

The present invention relates to a system of generating and utilizing alternating electric currents, and comprises certain improvements in an alternating-current dynamo-electric machine which I contemplate using especially as a generator, in the wiring of the external circuit, and in the arrangement of the translating devices, all of which improvements go to make up an alternating system such that it is possible to supply from a single generator or group of generators and a common system of circuits single-phase currents to lamps or other translating devices requiring only single-phase currents, together with multiphase currents for multiphase motors or other translating devices which require currents differing in phase.

To illustrate one practical application which may be made of the invention, I have shown in the accompanying drawings a power plant which may consist of a single generator or group of generators working in series or multiple, and for the external circuit three mains. Between two of these mains, which are referred to hereinafter as the "single-phase" circuit or outside mains, there is maintained by the generating action of the armature-conductors acting in series or summatively a difference of potential which, under changes of load and other conditions, may be maintained such as to suit the requirements of the single-phase translating devices. Between the third or intermediate main and the outside mains, respectively, there are maintained differences of potential by the action of different sections or groups of sections of the armature-conductors acting individually, which, while less than that between the outside mains, are not necessarily equal in amount and are displaced in phase. In this manner lamps or other single-phase translating devices may be fed with single-phase currents at a constant potential by being connected directly or through transformers with the outside mains exactly the same as in any ordinary single-phase system. Translating devices requiring multiphase currents are fed from all three mains. In the specific arrangement herein shown the primary circuits of two transformers are connected with the intermediate main and one or the other of the outside mains in such manner that they receive currents of different phase, and the secondary currents induced in the transformers may be used to drive multiphase motors or other apparatus requiring multiphase currents.

The generator employed has an armature-winding wherein there are two or more sections connected in series and coöperating to generate single-phase currents, which are fed to the single-phase circuit, but the sections, singly or in groups, are displaced angularly on the armature, so as to tend individually to generate currents of displaced phase, which may be fed to the three mains constituting the multiphase circuit.

Circuit connections to the two outside mains are brought out from the ends of the armature-winding, and an intermediate connection or connections is taken from between the sections of the armature-winding and put in circuit with the intermediate main of the external circuit when it is desired to utilize multiphase as well as single-phase currents. When this intermediate connection is established, currents are obtainable between the outside mains and the intermediate main which do not agree in phase with the currents which flow between the outside mains, and which likewise are out of phase with one another. A regulator is provided for regulating the generator or generators so as to preserve a constant potential or a rising potential under increased load in the single-phase circuit in order that the single-phase translating devices may operate satisfactorily. In the manner which is thus generally outlined lamps, single-phase, two-phase, or three-phase motors, and, in fact, a wide variety of translating devices may all be run from a common source of energy and distributing system of mains, and the lamps will not be influenced by any variations of load.

Making specific reference to the accompanying drawings, Figure 1 shows an alternating-current system in diagram embodying the present invention. Figs. 2 and 3 show in diagram the mode of winding the armature of the generator, and Fig. 4 is an explanatory diagram of the relation of the electromotive forces developed in the armature.

An alternating-current generator G, used as the source of energy, is similar to the single-phase generators now in common use, except in so far as the armature-winding and connections are concerned. For exciting its field there is shown a separate continuous-current dynamo E, and by a resistance E' or any desired form of regulating mechanism the exciting-current is controlled so as to regulate satisfactorily the main generator. The preferred armature-winding for the generator is indicated in Fig. 2, which, however, is illustrative of the invention as applied to a bipolar machine. In practicing the invention the armature will generally be of the multipolar type, coacting with a suitable multipolar field-magnet structure, and the coils may occupy recesses in the laminated armature. The armature-winding is divided into two sections C C', displaced angularly upon the armature and connected in series, one end being shown at $d$ and the other at $d'$. The angular displacement of the sections is such that they may work efficiently in series in generating single-phase currents, though, individually considered, each coil tends to generate a current of different phase from the other. I prefer a displacement of the sections amounting to an angle of sixty degrees, because I am in this way enabled to obtain, by means of two transformers, a regular three-phase system by reversing the primary or secondary of one of the transformers.

The ends of the armature-winding are brought to rings R R² on the armature-shaft or like terminals for making connection with an external circuit, while a third ring R' is connected to the sections C C' at an intermediate point $f$. Now upon rotating the armature electromotive forces will be set up in the sections C C', which when these sections stand at an angle of sixty degrees to one another may be represented by the parallelogram of forces seen in Fig. 4, wherein line 1 represents, for example, the electromotive force of section C and line 2 the electromotive force of section C', while the dotted line 3, being the resultant of these two forces, will then indicate the electromotive force between the outside rings R R² or the maximum electromotive force generated by the armature-sections acting summatively. When the load varies, the electromotive forces developed in the two armature-sections may change in phase relation and intensity. For instance, on increased load the electromotive forces may assume the relation indicated by the lines 4 and 5 in Fig. 4; but the resultant may be preserved the same as will be seen from the diagram by properly regulating the exciting-current. Hence the lights which are sensitive to changes of potential will not be influenced, while the motors, though subject to changes of potential, are less sensitive thereto and will operate satisfactorily. In Fig. 3 another form of winding for the armature is illustrated, comprising, as before, two sections C C', joined in series and terminating at $d\ d'$, while the intermediate connection is shown at $f$. This form of winding needs no special description, as the mode of operation involved is the same as that already set forth.

The generator being organized as already explained, the distributing system of circuits comprises two outside mains $a\ c$, joined, respectively, to the two rings R R², while a third main $b$ is joined to the ring R' and extends only to those parts of the circuit where multiphase currents are desired. Between the two outside mains there will exist the maximum potential generated by all the armature-conductors in series, and this potential may be maintained constant or controlled in any desired manner to suit the conditions of the circuit, while between these two mains and the intermediate main there will exist lower potentials corresponding to those generated by the sections of the armature-windings acting individually but displaced in phase from the main potential. A voltmeter V is shown connected across the mains of the single-phase circuit to indicate the potential therein and thus to assist in maintaining the desired regulation.

A number of consumption-circuits containing translating devices are shown, which are supplied with current from the mains $a$, $b$, and $c$, and for this purpose tension-reducing transformers are employed. The primaries of the transformers T and T' are connected across the outside mains $a\ c$, and in the secondary circuits of these transformers are shown multiple groups of lamps or other single-phase translating devices, which in the drawings are indicated as arranged on the ordinary three-wire system. The transformer T⁴ is arranged in a similar manner and also feeds lamps coupled in circuit in the manner described. The transformer T⁷ has its primary coupled with the outside mains and feeds current to a two-wire circuit of lamps. The multiphase translating devices, which are herein shown as three-phase motors M M', are supplied with current from sets of transformers T³ T² and T⁵ T⁶. The primary of one transformer of each such set is connected in circuit between the intermediate main $b$ and one of the outside mains—as, for example, $c$—while the other transformer of the set is connected between the intermediate main and the other outside main $a$. The two primaries are also connected together, as appears in the diagram. It will be understood from the explanation already given of the action of the generator that currents will flow between the three mains and through the primaries of these sets of transformers which will differ from one another in phase, and which will likewise be out of phase with the current flowing directly between the outside mains through the primaries of the other transformers feeding the lights. When the displacement in phase amounts to sixty degrees, a true three-phase system may be secured, such as is necessary for operating three-phase motors or other three-phase translating devices, by reversing the primary or secondary of one of the transformers making up a set. To illustrate this, I have shown the secondary of transformer $T^3$ reversed. The two secondaries are connected together and the three terminals of the motor are connected, respectively, with the end terminals and the common terminal of the secondaries. It is also possible to operate a three-phase motor by means of two transformers supplied with current in the manner described by reversing one of the three sets of motor-coils. This is shown diagrammatically in connection with the motor $M'$, where the reversed coil is indicated at $g$, while the other two armature-coils are seen at $g'$ $g^2$. The field of this motor is excited by a direct-current generator $E^2$, regulated by a resistance $r$.

What I claim as new, and desire to secure by Letters Patent, is—

1. The combination in an alternating-current generator, of armature-conductors arranged in sections angularly displaced in such manner that such sections tend individually to generate currents substantially sixty degrees apart in phase, with terminals leading to an external circuit, and coupled to said generating-conductors in such manner that the machine may deliver either multiphase currents displaced substantially sixty degrees in phase, or single-phase currents, as set forth.

2. The combination in an alternating-current generator, of armature-conductors arranged in sections angularly displaced in such manner that such sections tend individually to generate currents substantially sixty degrees apart in phase, with means for converting such displaced currents into a three-phase-current system suitable for operating three-phase translating devices, as set forth.

In testimony whereof I hereto set my hand this 4th day of January, 1894.

CHARLES P. STEINMETZ.

Witnesses:
JOHN W. GIBBONEY,
BENJAMIN B. HULL.